(12) United States Patent
Hwang et al.

(10) Patent No.: US 6,888,996 B2
(45) Date of Patent: May 3, 2005

(54) FIBER OPTIC CABLE IDENTIFICATION KIT AND ITS METHOD

(76) Inventors: Richard Hwang, Nei-Hu P.O. Box 6-105, Taipei (TW); Memiee Hwang, Nei-Hu P.O. Box 6-105, Taipei (TW); Wayne Hwang, P.O. Box 8242, Goleta, CA (US) 93118; Jim Hwang, P.O. Box 13706, La Jolla, CA (US) 92039

( * ) Notice: Subject to any disclaimer, the term of this patent is extended or adjusted under 35 U.S.C. 154(b) by 10 days.

(21) Appl. No.: 10/423,652

(22) Filed: Apr. 28, 2003

(65) Prior Publication Data

US 2004/0213522 A1 Oct. 28, 2004

(51) Int. Cl.[7] ............................. G02B 6/00; G02B 6/44
(52) U.S. Cl. ......................................... 385/139; 53/134
(58) Field of Search ............................... 385/53, 76–78, 385/100, 134–137, 139, 147; 356/73.1; 359/73.1

(56) References Cited

U.S. PATENT DOCUMENTS

| | | | | |
|---|---|---|---|---|
| 5,196,899 A | * | 3/1993 | Serwatka | 356/73.1 |
| 5,329,348 A | * | 7/1994 | Nimura et al. | 356/73.1 |
| 5,764,043 A | * | 6/1998 | Czosnowski et al. | 324/66 |
| 6,086,263 A | * | 7/2000 | Selli et al. | 385/88 |
| 6,094,261 A | * | 7/2000 | Contarino, Jr. | 356/73.1 |
| 6,633,717 B1 | * | 10/2003 | Knight et al. | 385/135 |

* cited by examiner

*Primary Examiner*—Kareh C. Kianni
*Assistant Examiner*—Christopher M. Kalivoda

(57) ABSTRACT

A kit for identifying fiber optic connections in a fiber optic cabling system comprises a plurality of indication optic terminators and at least one test light generator. The fiber optic system comprises a patching device, a plurality of ports furnished on the patching device, a plurality of outlets remote from the patching device, and a plurality of fiber optic cables for optically connecting the ports and the outlets. Plurality of indication optic terminators are attached onto each of the ports of the patching device. By using the test light generator to apply a test light to one of the outlets, the test light reaches a corresponding connected port of the patching device through the connection of fiber optic cable so as to make the corresponding indication optic terminator attached onto that connected port to light. Therefore, by repeating the process of distinguishing the light of the indication optic terminator one by one, all of the fiber optic connections between the connected ports and outlets can be identified. After completing the job of fiber optic connection identification, all of the indication optic terminators can be detached and kept for re-use.

18 Claims, 3 Drawing Sheets

FIBER OPTIC CABLE IDENTIFICATION KIT AND ITS METHOD

FIELD OF THE INVENTION

This invention comprises of a kit and a method for performing fiber optic cable identification, more specifically of a kit and a method which utilizes a test light generator and indication optic terminators in a fiber optic cabling system to identify cable connections between a patching device and remote outlets.

BACKGROUND OF THE INVENTION

Because fiber optic cabling systems have the advantages of fast transmitting speed, vast data transmission and less interference, more and more traditional networking systems are replaced by advanced fiber optic cabling systems in the field of communication during the recent years.

As the usage of fiber optic cabling systems grows rapidly, the amount of fiber optic cables in a fiber optic cabling system also increase rapidly. It is often necessary to identify individual fiber optic cable connection extending between two locations. Please refer to FIG. 1. For example, a typical fiber optic cabling system such as a network system usually involves hundreds or even thousands of end users located at different sites or places sharing the service provided by (or controlled by) the same server system 10. The server system 10 is connected with a distribution frame 11 which contains a plurality of patching devices 111 by means of fiber optic cables 12. The patching devices 11 are further connected to multiple outlets 131, 132, 133, 134 and 135, which are located remote from the patching devices 11 by means of fiber optic cables 14. Sometimes these outlets 131~135 are located away from each other. Some outlets 131 may be connected with another server system 10a. Some outlets 132 may be connected with a network interface device 15 which can further be connected to the Internet 151 such that users 90 will be able to access the server system 10 via internet 151. Some outlets 133 may connect with application devices 16 such like a DVD player, an audio system or other instruments capable of using fiber optic cables for data transmission. Some outlets 134 may connect with yet another patching device 17 for further connection with other instruments 171, 172. Some other outlets 135 may even connect with wireless interface devices 18 such that users will be able to access the server system 10 wirelessly. Most of the above mentioned outlets 131~135 require "fiber optic cables 14" for connection with the patching devices 111 and the server system 10. As a result, the fiber optic cabling system becomes an issue.

In many fiber optic cabling systems, thousands of fiber optic cables 14 coming from different locations are gathered and then connected to the distribution frame 11, such as a patch panel stack, before connecting to the server system 10. It is obvious that the management of the fiber optic cables 14 would be a critical issue and a difficult task for such large fiber optic cables systems. For example, to identify which remote outlet is connected to which port of the patching device 111 can be extremely time consuming and problematic using current industry methods of trial and error. The present invention discloses a kit and a method that can be used for identifying the fiber optic connections in fiber optic cabling systems efficiently and systematically.

SUMMARY OF THE INVENTION

The primary object of the present invention is to provide a kit and a method using the kit to assist the identification of fiber optic connections in a fiber optic cabling system.

A preferred embodiment of the kit of the present invention comprises a plurality of indication optic terminators and at least one test light generator. The indication optic terminators are for attaching onto each of the ports of the patching means, while using a test light generator for applying a test light to one of the outlets which is located remote from the patching device. As the test light applied at the outlet can reach a corresponding connected port of the patching means through the connection of fiber optic cable, the corresponding indication optic terminator attached onto that connected port will be lit. Therefore, by repeating the process of distinguishing the light of the indication optic terminator one by one, all of the fiber optic connections between the connected ports and outlets can be identified. After completing the job of fiber optic connection identification, all of the indication optic terminators can be detached and kept for re-use.

In another preferred embodiment, the kit comprises at least two test light generators, the test light from each of the test light generators are of different light frequencies so to be differentiable when being utilized simultaneously.

In a further preferred embodiment, a novel design of the indication optic terminator in accordance with the present invention is disclosed. This indication optic terminator comprises a housing, an attaching means located at one end of the housing, a fiber optic furnished inside the attaching means, a lamp means and a light sensor located inside the housing. The attaching means is attachable to a pre-selected type of fiber optic connectors and is able to receive light from the fiber optic connector. The lamp means includes a lamp and a battery coupled with the lamp. The lamp means can emit light according to a switching status. The light sensor is located adjacent to the attaching means and is coupled with the lamp means. The light sensor is able to detect the light received from the attaching means and control the switching status according to the detection. By employing this variation design, the indication optic terminator of the present invention will be able to provide better visibility for distinguishing if there is light coming from the fiber optic connector. This provides that no matter if the light from the fiber optic connector is strong enough, the light of the lamp will always be able to provide sufficient light for user to see since it is powered by a battery.

DETAILED DESCRIPTION OF THE INVENTION

The primary concept of the present invention is to provide a plurality of indication optic terminators for attachments onto each of the ports of the patching means, while using a test light generator for applying a test light to one of the outlets which is located remote from the patching means. As the test light applied at the outlet can reach a corresponding connected port of the patching means through the connection of a fiber optic cable, the corresponding indication optic terminator attached onto that connected port will be lit. Therefore, by repeating the process of distinguishing the light of the indication optic terminator one by one, all of the fiber optic connections between the connected ports and outlets can be identified. After completing the job of fiber optic connection identification, all of the indication optic terminators can be detached and kept for re-use.

Following are detailed descriptions of some preferred embodiments of the group wiring patching device and the wire pair identification process using the same in accordance with the present invention.

Figure 1:
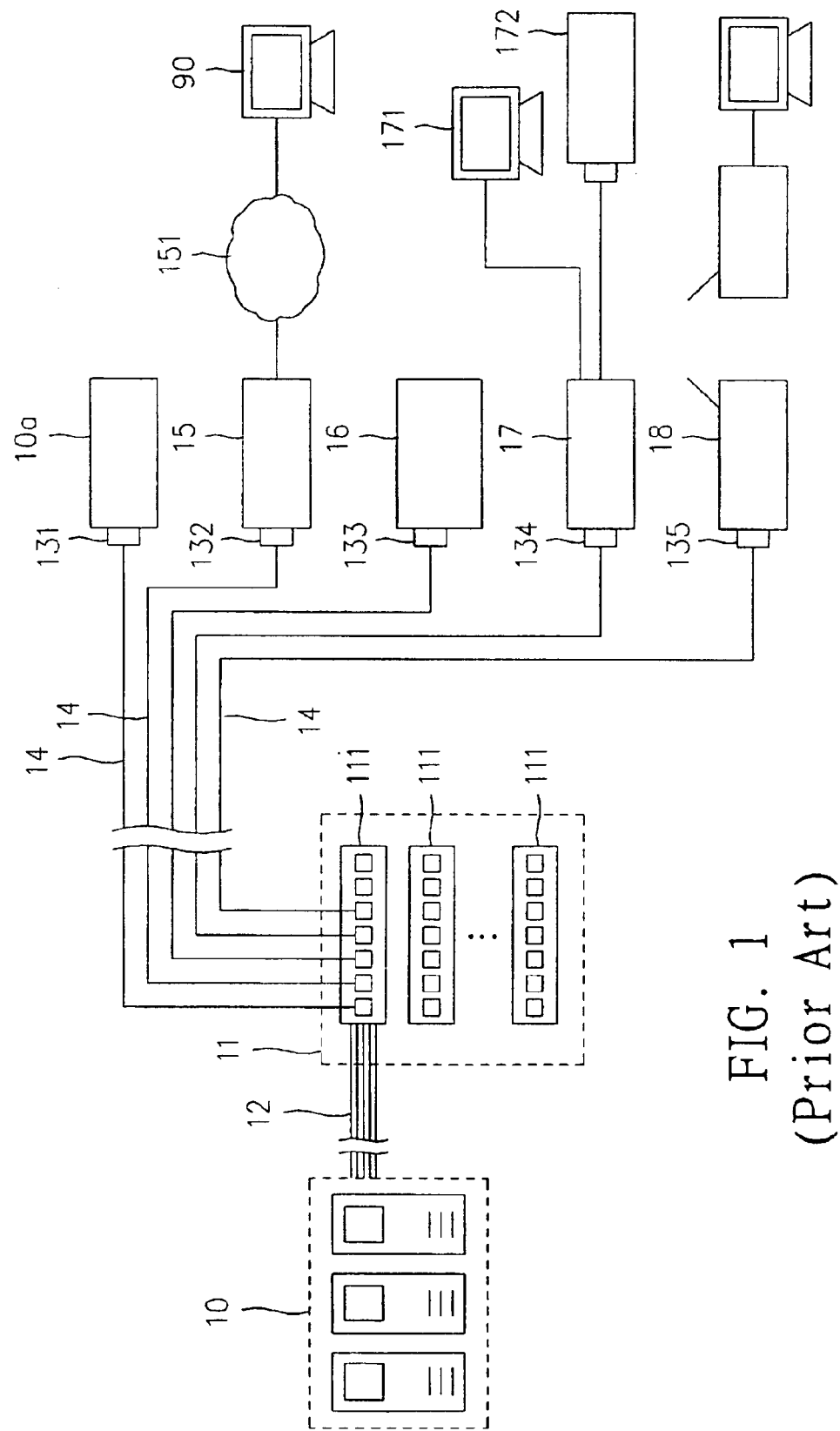
FIG. 1 is a schematic drawing showing a typical example of a fiber optic cabling system.
Figure 2:
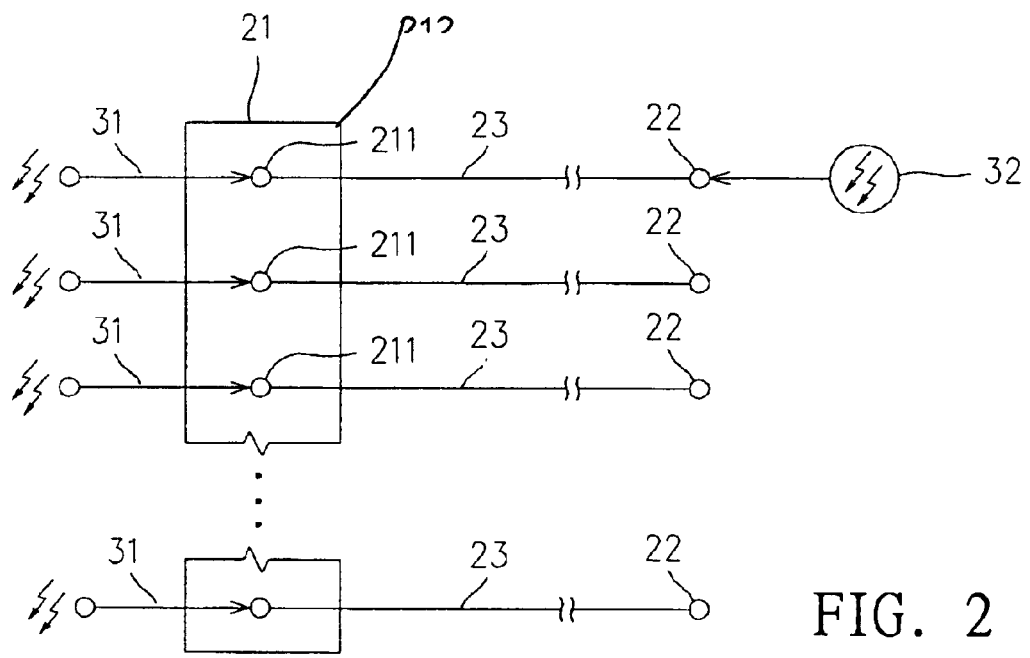
FIG. 2 is a schematic view of a preferred embodiment of the fiber optic cable identification kit, which is in co-operation with the patching device, outlets and fiber optic cables of the present invention.

Please refer to FIG. 2, which is a schematic view of a preferred embodiment of the fiber optic cable identification kit. The fiber optic cabling system comprising a patching means 21, a plurality of ports 211 furnished on the patching means 21, a plurality of outlets 22 remote from the patching means 21, and a plurality of fiber optic cables 23 for optically connecting the ports 211 and the outlets 22. In the present invention, the patching means 21 is preferably a patching device having the ports 211 furnished on a front panel 212 (or outer side) of the patching device. The fiber optic cables 23 are extending out of the back side of the patching device for further connecting to the outlets 22. These fiber optic cables 23 are coupled with the ports 211 by means of connecters or adapters (not shown) inside the patching device. The kit of the present invention comprises a plurality of indication optic terminators 31 and at least one test light generator 32 for applying a test light. The indication optic terminators 31 are attachable to the ports 211 of the patching means 21. The test light generator 32 can apply a test light from one of the outlets 22 located remote from the patching means 21. The test light applied at the outlet 22 passes through the fiber optic cable 23 and reaches a corresponding connected port 211 of the patching means 21 and causes a corresponding indication optic terminator 31 attached thereon to light. The specific pair of port 211 (attached with lit terminator 31) and outlet 22 (attached with generator 32) which connected by the specific fiber optic cable 23 can be easily distinguished by simply seeing the light. As a result, the fiber optic connection between that specific outlet 22 and port 211 is identified. When the test light generator 32 is moved to attach onto another outlet 22, then another indication optic terminator 31 will light so as to identify another fiber optic connection. Therefore, by applying the test light generator 32 to each of the outlets 22 in a one-by-one manner, all of the fiber optic connections in the fiber optic cabling system can be identified.

Preferably, the ports 211 of the patching means 21 are of a type chosen from a group comprising of fiber optic connector and fiber optic adapter. Similarly, the outlets 22 can also be of the type of fiber optic connector or fiber optic adapter.

Figure 3:
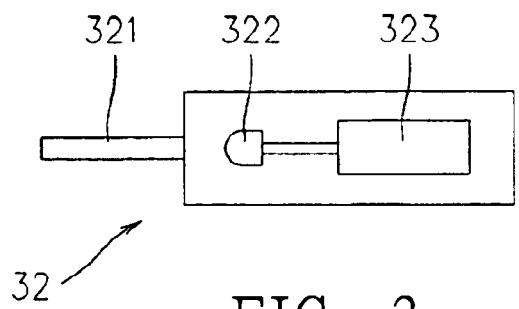
FIG. 3 is a schematic view of a preferred embodiment of the test light generator of the fiber optic cable identification kit of the present invention.

Please refer to FIG. 3, which illustrates a preferred embodiment of the test light generator 32 of the present invention. The preferred embodiment of the test light generator 32 comprises a connecting means 321, a light emitting means 322 and a power source 323. The connecting means 321 is for optical attachment onto one of the outlets 22 remote from the patching means 21. A preferred embodiment of the connecting means 321 is of the type of fiber optic connector. However, the connecting means 321 can also be in the type of fiber optic adapter. The light emitting means 322 connects to the connecting means 321. Preferable embodiments of the light emitting means 322 can be an LED, a light bulb or a laser. The power source 323 (which can be a DC battery as preferred) is used to power the light emitting means 322 to emit light which is then transmitted through the connecting means 321.

Figure 4:
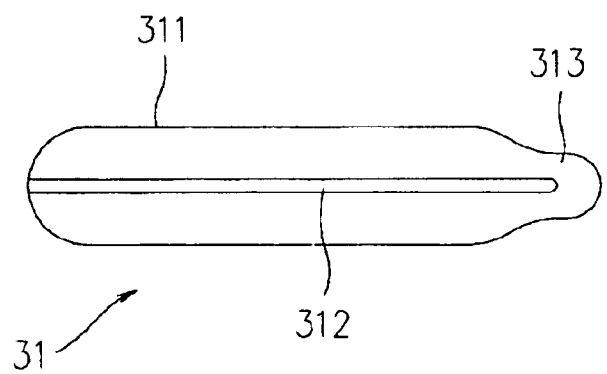
FIG. 4 is a schematic view of a preferred embodiment of the indication optic terminator of the fiber optic cable identification kit of the present invention.

Please refer to FIG. 4, which illustrates a preferred embodiment of the indication optic terminator 31 of the present invention. The indication optic terminator 31 comprises an attaching means 311 and a lamp means 313. The attaching means 311 is attachable to a pre-selected type of fiber optic connectors/adaptors and is able to receive light from the fiber optic connector/adaptor. In the preferred embodiment shown in FIG. 4, the attaching means 311 of the indication optic terminator 31 is merely a rod-shaped structure which is made of transparent or semi-transparent material in a shape and size just capable of being plugged into a fiber optic adapter. However, the attaching means 311 of the indication optic terminator 31 can also be made to be in the form of a fiber optic connector or fiber optic adapter. The center 312 of the indication optic terminator 31 is furnished with a short-length optic fiber or a nylon wire or even a hole for light to transmit through. The lamp means 313 is integral with the attaching means 311 and is for dispersing the light. In the preferred embodiment shown in FIG. 4, the lamp means 313 is a hemisphere-shaped structure which is made of transparent or semi-transparent material and has a diameter slightly greater than the diameter of a ferrule. However, in another preferred embodiment, the lamp means 313 can also be a short length of fiber optic. The total length of the indication optic terminator 31 is preferably larger than the depth of a fiber optic adapter such that the lamp means 313 will be able to expose out of the patching means 21 to make the light visible.

Figure 5:
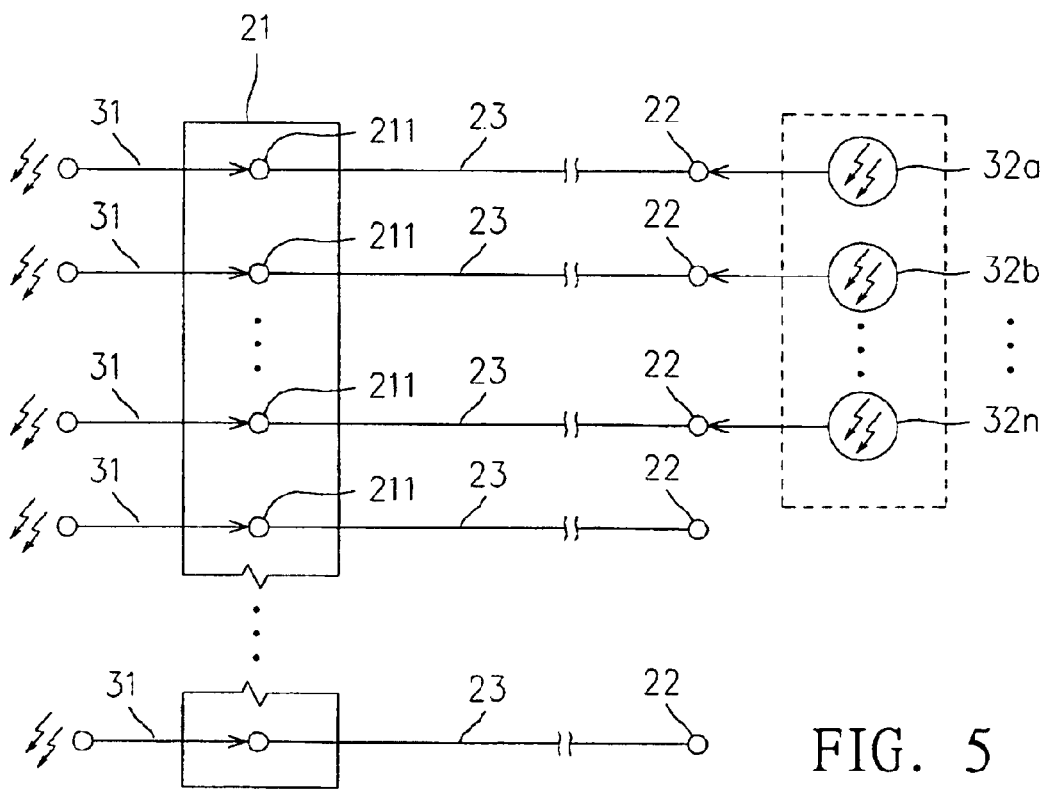
FIG. 5 is a schematic view of another preferred embodiment of the fiber optic cable identification kit which comprises several test light generators each of different light frequencies so to be differentiable when being utilized simultaneously.

Please refer to FIG. 5, which illustrates another preferred embodiment of the present invention. Because most of the elements shown in FIG. 5 are same or similar to those shown in FIG. 2, therefore similar arrangement and technique used in FIG. 5 will be skipped without further description. The only technique different from the one shown in FIG. 2 is that the kit illustrated in FIG. 5 comprises at least two test light generators 32a, 32b, . . . 32n. The test light from each of the test light generators 32a, 32b, . . . 32n are of different frequencies of light so to be differentiable when being utilized simultaneously. Therefore, the workers can attach several test light generators 32a, 32b, . . . 32n to several outlets 22 and perform the identification of several fiber optic connections in one time.

Figure 6:
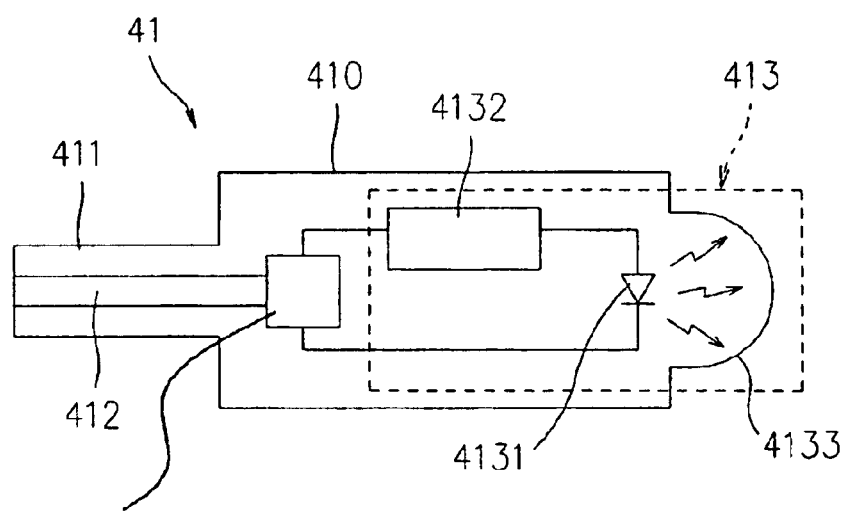
FIG. 6 is a schematic view of another preferred embodiment of the indication optic terminator of the fiber optic cable identification kit of the present invention.

Please refer to FIG. 6, which illustrates another preferred embodiment of the indication optic terminator 41 in accordance with the present invention. The indication optic terminator 41 comprises a housing 410, an attaching means 411 located at one end of the housing 410, a fiber optic 412 furnished inside the attaching means 411, a lamp means 413 and a light sensor 414 located inside the housing 410. The attaching means 411 of the indication optic terminator 41 is preferably a rod-shaped ferrule which is adaptable with a fiber optic adapter. For example, the attaching means 411 of the indication optic terminator 41 can be plugged into one of the ports 211 of the patching means 21 shown in FIG. 2. The fiber optic 412 is furnished inside the attaching means 411 for transmitting light coming from outside of the attaching means 411 into the housing 410. The lamp means 413 further comprises a lamp 4131 (for example, a LED), a power source 4132 (e.g. a DC battery) and a display means 4133. In the preferred embodiment, the display means 4133 is a hemisphere-shaped structure which is made of transparent or semi-transparent material and is located at another end of the housing 410. The lamp 4131 and power source 4132 are both furnished within the housing 410 and coupled with the light sensor 414. In addition, the lamp 4131 is preferably located adjacent to the display means 4133 such that the light emitted from the lamp 4131 will be visible from outside of the housing. The light sensor 414 connects to an inner end of the fiber optic 412 and is capable of detecting light coming from the fiber optic 412 so as to control the lighting status of the lamp means 413. When there is light coming from the fiber optic 412, the light sensor 414 will be actuated to make the circuit of the lamp means 413 to be a "Close Loop" such that the lamp 4131 can be powered by the power source 4132 to emit light. Therefore, users can see the light from the display means 4133. If there is no light coming from the fiber optic 412, then the light sensor 414 will make the circuit of the lamp means 413 to be "Open" such that the lamp 4131 will not light. By employing such novel design, the indication optic terminator 41 of the present invention will be able to provide an active lighting function and better visibility for distinguishing if there is light coming from the fiber optic 412. It is because that no matter if the light received by the fiber optic 412 is strong enough, the light of the lamp 4131 will always be able to provide sufficient light for the user to see. To perform the identification of fiber optic connections, there usually needs to be at least two workers. One of the workers is positioned at the location of the patching means, while another worker is positioned at one of the remote outlets. A preferred embodiment to perform the identification of fiber optic connections by using the kit of the present invention comprises the following steps:

a. attaching each port of the patching means with one indication optic terminator, so that the fiber optic connections desired to be identified are optically connected to the indication optic terminators;

b. using the test light generator to apply test light to one of the remote outlet to be tested, said test light reaching one of the ports which is connected therewith by the fiber optic cable and causing the indication optic terminator which is attached thereon to light;

c. identifying the fiber optic connection between the connected port and outlet which makes the indication optic terminator to light;

c1. the worker at the patching means communicating the fact of a successful identification to the other worker who is at the remote outlet;

d. choosing another remote outlet to test;

e. repeating steps "b." through "d." sequentially until all fiber optic connections between the outlets and the ports of the patching means are identified; and f. removing all of the indication optic terminators from the patching means for re-use.

However, in another embodiment, the worker can also immediately remove the indication optic terminator which has been identified when performing the step "d". Therefore, when repeating steps "b." through "d." to test all fiber optic connections, the indication optic terminators can also be removed one-by-one. When completing the identification of all fiber optic connections, all of the indication optic terminators would already have been removed. As a result, the workers will no longer need to perform step "f.".

While the present invention has been shown and described with reference to a preferred embodiment thereof, and in terms of the illustrative drawings, it should be not considered as limited thereby. Various possible modifications, omissions, and alterations could be conceived of by one skilled in the art to the form and the content of any particular embodiment without departing from the scope and the spirit of the present invention.

What is claimed is:

1. A kit for identifying fiber optic connections in a fiber optic cabling system, said fiber optic system comprising a patching means, a plurality of ports furnished on the patching means, a plurality of outlets remote from the patching means, and a plurality of fiber optic cables for optically connecting the ports and the outlets, said kit comprising:

a plurality of indication optic terminators for attachment onto the ports of the patching means; and a test light generator for applying a test light to at least one of the outlets;

wherein said test light applied at the outlet reaches a corresponding connected port of the patching means through the connection of fiber optic cable and causes a corresponding indication optic terminator attached onto that connected port to light;

wherein each of the indication optic terminators further comprises:

an attaching means attachable to the port and being able to receive test light from the test light generator, the attaching means being merely a rod-shaped structure in a shape just capable of being plugged into the port, the attaching means having a length longer than the depth of the port;

a short-length optic fiber furnished in a center of the attaching means for the test light received by the attaching means to transmit through; and a hemisphere-shaped structure formed at one end of the short-length optic fiber and made of transparent material for dispersing test light transmitted by the short-length optic fiber so as to make the test light visible.

2. The kit of claim 1, wherein the test light generator further comprises:

a connecting means for optical attachment onto one of the outlets remote from the patching means;

a light emitting means connected to the connecting means; and a power source to power the light emitting means enabling light to be transmitted through the connecting means.

3. The kit of claim 2, wherein said connecting means is selected from a group comprising of a test connector and a test adapter.

4. The kit of claim 2, wherein said light emitting means is selected from a group comprising of an LED, a light bulb and a laser.

5. The kit of claim 2, wherein said power source is a DC battery.

6. The kit of claim 1, wherein said kit comprises at least two test light generators, the test light from each of the test light generators are of different light frequencies so to be differentiable when being utilized simultaneously.

7. The kit of claim 1, wherein said ports of the patching means are of a type selected from a group comprising of fiber optic connector and fiber optic adapter.

8. The kit of claim 1, wherein said outlets are of a type selected from a group comprising of fiber optic connector and fiber optic adapter.

9. The kit of claim 1, wherein the attaching means is selected from a group comprising of fiber optic connector and fiber optic adapter.

10. The kit of claim 1, wherein the indication optic terminator further comprises:
- a housing, the attaching means being located at one end of the housing and away from the hemisphere-shaped structure;
- a light sensor located between the short-length optic fiber and the hemisphere-shaped structure, said light sensor being capable of detecting the test light transmitted by the short-length optic fiber; and
- a lamp means furnished in the housing and coupled with the light sensor, said lamp means including a lamp located adjacent to the hemisphere-shaped structure and a battery coupled with said lamp, said lamp means being capable of emitting light when the light sensor detected the test light transmitted by the short-length optic fiber.

11. A method of using a kit to identify fiber optic connections in a fiber optic cabling system, said fiber optic system comprising a patching means, a plurality of ports furnished on the patching means, a plurality of outlets remote from the patching means, and a plurality of fiber optic cables for optically connecting the ports and the outlets so as to define the fiber optic connections between the outlets and the ports of the patching means;

said kit comprising a plurality of indication optic terminators for attachment onto the ports of the patching means and a test light generator for applying a test light to at least one of the outlets;

wherein each of the indication optic terminators further comprises:
- an attaching means attachable to the port and being able to receive test light from the test light generator, the attaching means being merely a rod-shaped structure in a shape just capable of being plugged into the port, the attaching means having a length longer than the depth of the port;
- a short-length optic fiber furnished in a center of the attaching means for the test light received by the attaching means to transmit through; and
- a hemisphere-shaped structure formed at one end of the short-length optic fiber and made of transparent material for dispersing test light transmitted by the short-length optic fiber so as to make the test light visible;

said method comprising the steps of:
a. attaching each port of the patching means with one indication optic terminator, so that the fiber optic connections desired to be identified are optically connected to the indication optic terminators;
b. using the test light generator to apply test light to one of the remote outlet to be tested, said test light reaching one of the ports which is connected therewith by the fiber optic cable and causing the indication optic terminator which is attached thereon to light;
c. identifying the fiber optic connection between the connected port and outlet which makes the indication optic terminator to light;
d. choosing another remote outlet to test;
e. repeating steps "b." through "d." sequentially until all fiber optic connections between the outlets and the ports of the patching means are identified; and
f. removing all of the indication optic terminators from the patching means.

12. The method of claim 11, wherein said method needs to employ at least two workers, one of the workers is positioned at the location of the patching means while another worker is positioned at one of the remote outlets.

13. The method of claim 12, further comprising a step between step "c." and step "d.":
c1. the worker at the patching means communicating the fact of a successful identification to the other worker who is at the remote outlet.

14. The method of claim 11, wherein said kit comprises at least two test light generators, the test light from each of the test light generators are of different colors so to be differentiable when being utilized simultaneously.

15. A method of using a kit to identify fiber optic connections in a fiber optic cabling system, said fiber optic system comprising a patching means, a plurality of ports furnished on the patching means, a plurality of outlets remote from the patching means, and a plurality of fiber optic cables for optically connecting the ports and the outlets so as to define the fiber optic connections between the outlets and the ports of the patching means;

said kit comprising a plurality of indication optic terminators for attachment onto the ports of the patching means and a test light generator for applying a test light to at least one of the outlets;

wherein each of the indication optic terminators further comprises:
- an attaching means attachable to the port and being able to receive test light from the test light generator, the attaching means being merely a rod-shaped structure in a shape just capable of being plugged into the port, the attaching means having a length longer than the depth of the port;
- a short-length optic fiber furnished in a center of the attaching means for the test light received by the attaching means to transmit through; and
- a hemisphere-shaped structure formed at one end of the short-length optic fiber and made of transparent material for dispersing test light transmitted by the short-length optic fiber so as to make the test light visible;

said method comprising the steps of:
a. attaching each port of the patching means with one indication optic terminator, so that the fiber optic connections desired to be identified are optically connected to the indication optic terminators;
b. using the test light generator to apply test light to one of the remote outlet to be tested, said test light reaching one of the ports which is connected therewith by the fiber optic cable and causing the indication optic terminator which is attached thereon to light;
c. identifying the fiber optic connection between the connected port and outlet which makes the indication optic terminator to light;
d. choosing another remote outlet to test, and removing the indication optic terminator which has been identified; and
e. repeating steps "b." through "d." sequentially until all fiber optic connections between the outlets and the ports of the patching means are identified.

16. The method of claim 15, wherein said kit comprises at least two test light generators, the test light from each of the test light generators are of different colors so to be differentiable when being utilized simultaneously.

17. An indication optic terminator for use with a kit for identifying fiber optic connections in a fiber optic cabling system, said fiber optic system comprising a patching means and a plurality of pre-selected type of fiber optic connectors furnished on the patching means, said indication optic terminator further comprising:

a housing;

an attaching means located at one end of the housing, the attaching means being attachable to said fiber optic connector, the attaching means being able to receive light from the fiber optic connector, a short-length optic fiber furnished in a center of the attaching means for the light received by the attaching means to transmit through;

a lamp means furnished in the housing, said lamp means including a lamp and a battery coupled with said lamp, said lamp means being capable of emitting light according to a switching status; and a light sensor located adjacent to one end of the short-length optic fiber and coupled with the lamp means, the light sensor being able to detect the light received from the attaching means and control said switching status according to the detection.

18. The indication optic terminator of claim 17, wherein said fiber optic cabling system further comprises a plurality of outlets remote from the patching means and a plurality of fiber optic cables for optically connecting the fiber optic connectors and the outlets; wherein said kit comprises:

a plurality of indication optic terminators for attachment onto the fiber optic connectors of the patching means; and a test light generator for applying a test light to at least one of the outlets;

wherein said test light applied at the outlet reaches a corresponding connected fiber optic connector of the patching means through the connection of fiber optic cable and causes a corresponding indication optic terminator attached onto that connected fiber optic connector to light.

* * * * *